US012808646B2

(12) United States Patent
Ikeda

(10) Patent No.: US 12,808,646 B2
(45) Date of Patent: Nov. 24, 2026

(54) MEASUREMENT PROGRAM GENERATION METHOD AND THREE-DIMENSIONAL COORDINATE MEASURING MACHINE

(71) Applicant: Tokyo Seimitsu Co., Ltd., Tokyo (JP)

(72) Inventor: Keisuke Ikeda, Tsuchiura-city (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 407 days.

(21) Appl. No.: 18/491,148

(22) Filed: Oct. 20, 2023

(65) Prior Publication Data

US 2024/0183645 A1 Jun. 6, 2024

(30) Foreign Application Priority Data

Oct. 21, 2022 (JP) ................................ 2022-169127

(51) Int. Cl.
*G01B 5/008* (2006.01)
*G01B 21/04* (2006.01)

(52) U.S. Cl.
CPC .............. *G01B 5/008* (2013.01); *G01B 21/04* (2013.01)

(58) Field of Classification Search
CPC ........ G01B 21/04; G01B 5/008; G01B 11/03; G01B 21/045; G01B 11/005; G01B 5/004;

(Continued)

(56) References Cited

U.S. PATENT DOCUMENTS 5,198,990 A * 3/1993 Farzan ............... G05B 19/4207 702/168
8,516,710 B2 * 8/2013 Jordil .................. G01B 21/045 33/503

(Continued)

FOREIGN PATENT DOCUMENTS

| | | |
|---|---|---|
| CN | 1573284 A | 2/2005 |
| JP | 60-141490 A | 7/1985 |

(Continued)

OTHER PUBLICATIONS

Japanese Decision to Grant for counterpart Japanese Application No. 2022-169127, dated Jul. 2, 2026, with English translation.

*Primary Examiner* — Peter J Macchiarolo
*Assistant Examiner* — Anna Josephine Saunders
(74) *Attorney, Agent, or Firm* — Birch, Stewart, Kolasch & Birch, LLP

(57) ABSTRACT

The measurement program generation method includes: a manual operation step of executing a measurement element specifying operation to bring a probe into contact with measuring points of a measurement element and a measurement element confirming operation to indicate an end of the measurement element specifying operation; a coordinate value acquisition step of acquiring coordinate values of the measuring points with which the probe is brought into contact; a first intermediate point setting step of setting a first intermediate point each time when the coordinate values of one of the measuring points is acquired in the coordinate value acquisition step; a second intermediate point setting step of setting as a second intermediate point, a position of the probe when the measurement element confirming operation is executed; and a third intermediate point setting step of setting a third intermediate point during movement of the probe in the manual operation step.

7 Claims, 17 Drawing Sheets

(58) Field of Classification Search
CPC ............ G05B 19/4207; G05B 19/4202; G05B 19/42; G05B 19/423; B25J 9/1656; B25J 9/1664; G06T 11/20; G06T 7/00; G06F 17/17
USPC .................................................... 33/503, 559
See application file for complete search history.

(56) References Cited

U.S. PATENT DOCUMENTS

| | | | | |
|---|---|---|---|---|
| 9,587,928 | B2 * | 3/2017 | Przygodda | G01B 21/045 |
| 2003/0078694 | A1 | 4/2003 | Watanabe et al. | |
| 2004/0260509 | A1 | 12/2004 | Noda | |
| 2011/0056085 | A1 * | 3/2011 | Jordil | G01B 11/03<br>33/503 |
| 2016/0305777 | A1 * | 10/2016 | Racine | G01B 21/00 |
| 2024/0183645 | A1 * | 6/2024 | Ikeda | G01B 21/04 |

FOREIGN PATENT DOCUMENTS

| | | | |
|---|---|---|---|
| JP | 4-6405 | A | 1/1992 |
| JP | 6-213649 | A | 8/1994 |
| JP | 7-113628 | A | 5/1995 |
| JP | 8-14876 | A | 1/1996 |
| JP | 2002-172575 | A | 6/2002 |
| JP | 2004-17198 | A | 1/2004 |
| JP | 2004-93190 | A | 3/2004 |
| JP | 2015-75431 | A | 4/2015 |

* cited by examiner

FIG.10

| DISTANCE ei | |
|---|---|
| e1 | -0.01 |
| e2 | 0.01 |
| e3 | 0.015 |
| e4 | 0.015 |
| e5 | 0.1 |
| e6 | 3 |
| e7 | -0.01 |
| FITTING ERROR | 1.13457 |

MEASUREMENT PROGRAM GENERATION METHOD AND THREE-DIMENSIONAL COORDINATE MEASURING MACHINE

CROSS-REFERENCE TO RELATED APPLICATION

The present application claims priority under 35 U.S.C § 119(a) to Japanese Patent Application No. 2022-169127 filed on Oct. 21, 2022, which is hereby expressly incorporated by reference, in its entirety, into the present application.

BACKGROUND OF THE INVENTION

Field of the Invention

The present disclosure relates to a measurement program generation method of generating a measurement program for a three-dimensional coordinate measuring machine and a three-dimensional coordinate measuring machine.

Description of the Related Art

There has conventionally been known a three-dimensional coordinate measuring machine provided with a driving unit that displaces a position and an attitude of a probe to bring the probe into contact with each of a plurality of measurement elements (for example, straight lines, round holes, flat surfaces, and spheres) formed on a workpiece (object to be measured), to measure various aspects such as a size and shape, of the measurement elements.

In such a three-dimensional coordinate measuring machine, there may be a case where each measurement element is repeatedly measured for a plurality of workpieces having the same shape. In such a case, there is demand for securing the reproducibility of measurement results and for saving labor in a quality control process. Accordingly, for the three-dimensional coordinate measuring machine, a measurement program for indicating a measuring route of the probe is generated based on a measuring order of the measurement elements and positions of measuring points (coordinates of the contact points of the probe) for the respective measurement elements. The three-dimensional coordinate measuring machine then measures each measurement element of the workpieces while displacing the position and the attitude of the probe based on the measurement program (see, for example, Japanese Patent Application Laid-Open No. 6-213649).

Citation List

Patent Literature 1: Japanese Patent Application Laid-Open No. 6-213649

SUMMARY OF THE INVENTION

Conventionally, a measurement program for a three-dimensional coordinate measuring machine is generated semi-automatically by a user manually defining a measuring route (a measuring order of measurement elements and measuring points of each measurement element) of the probe. Alternatively, there is also known a technique of automatically generating a measurement program based on design information on workpieces, such as computer aided design (CAD) data.

However, the former method has a problem of occurrence of malfunctions due to human error (such as incorrect setting of the measuring route) and a problem of more complicated operation. The latter method has a problem of high difficulty in introduction for users who have little experience in the three-dimensional coordinate measuring machine or users who are unable to spare much time for operation of the three-dimensional coordinate measuring machine, i.e., the users who have little insight into the three-dimensional coordinate measuring machine.

In addition, Japanese Patent Application Laid-Open No. 6-213649 does not disclose a method of fully automatically generating the measurement program.

The present disclosure, which has been made in view of such circumstances, aims to provide a measurement program generation method and a three-dimensional coordinate measuring machine, which allow anyone to easily and automatically generate a measurement program free from possibility of malfunction.

To attain the object of the present disclosure, a measurement program generation method of generating a measurement program representing a measuring route of a probe of a three-dimensional coordinate measuring machine that measures one or more measurement elements of an object to be measured using the probe, includes: a manual operation step of manually executing a measurement element specifying operation to bring the probe into contact with measuring points on a measurement element, and a measurement element confirming operation to indicate an end of the measurement element specifying operation, for each of the one or more measurement elements; a coordinate value acquisition step of acquiring coordinate values of the measuring points with which the probe is brought into contact; a first intermediate point setting step of setting, each time when the coordinate values of one measuring point of the measuring points are acquired in the coordinate value acquisition step, a first intermediate point at a position that is offset from the one measuring point in a direction opposite a contact direction of the probe with the one measuring point, based on the coordinate values of the one measuring point and on the contact direction; a second intermediate point setting step of setting as a second intermediate point, a position of the probe when the measurement element confirming operation is executed; a third intermediate point setting step of acquiring a moving locus of the probe during movement of the probe in the manual operation step, approximating the moving locus by a plurality of straight lines, and setting a third intermediate point at an intersection point between the straight lines that are different from each other; and a program generation step of generating the measurement program, based on the coordinate values of the measuring points acquired in the coordinate value acquisition step, coordinate values of the second intermediate point set in the second intermediate point setting step, and coordinate values of the third intermediate point set in the third intermediate point setting step.

According to the measurement program generation method, the first intermediate points to the third intermediate points may be set automatically during execution of a teaching operation by the user, so that the measurement program can be generated automatically.

In the measurement program generation method according to another aspect of the present disclosure, the manual operation step includes a retreating operation to manually retreat the probe from the object to be measured to a replacement position where the probe is replaceable, the method further includes a fourth intermediate point setting step of setting as a fourth intermediate point, the replacement position when the retreating operation is executed, and in a case where the retreating operation is executed, in the program generation step, the measurement program is generated based on the coordinate values of the measuring points, the coordinate values of the second intermediate point, the coordinate values of the third intermediate point, and coordinate values of the fourth intermediate point set in the fourth intermediate point setting step. Accordingly, the first intermediate points to the fourth intermediate points can be set automatically during execution of the teaching operation by the user, so that the measurement program can be generated automatically.

In the measurement program generation method according to another aspect of the present disclosure, in the third intermediate point setting step, the moving locus is approximated by the plurality of straight lines by performing linear fitting on the moving locus. This makes it possible to approximate the moving locus by a plurality of straight lines and set the third intermediate point at each intersection point between the straight lines that are different from each other.

In the measurement program generation method according to another aspect of the present disclosure, the third intermediate point setting step includes: a repeat calculation step of repeatedly executing calculation of a fitting straight line that is fit to the moving locus from an initial position of the probe to a current position of the probe and calculation of a fitting error that is an error between the fitting straight line and the moving locus, during the movement of the probe until the probe reaches a first intersection point; and a determination step of determining whether or not the probe has passed a new intersection point each time when the fitting error is calculated in the repeat calculation step, based on whether or not the fitting error is larger than a predetermined threshold, and the threshold is variable. Thus, it is possible to adjust the determination intensity of a linear section in the moving locus of the probe (a tolerance range for determining that the linear section is regarded as continuing).

In the measurement program generation method according to another aspect of the present disclosure, the third intermediate point setting step includes: a repeat calculation step of repeatedly executing calculation of a fitting straight line that is fit to the moving locus from a previous intersection point to a current position of the probe and calculation of a fitting error that is an error between the fitting straight line and the moving locus, during the movement of the probe; and a determination step of determining whether or not the probe has passed a new intersection point each time when the fitting error is calculated in the repeat calculation step, based on whether or not the fitting error is larger than a predetermined threshold, and the threshold is variable. Thus, it is possible to adjust the determination intensity of a linear section in the moving locus of the probe (a tolerance range for determining that the linear section is regarded as continuing).

To attain the object of the present disclosure, a three-dimensional coordinate measuring machine which measures one or more measurement elements of an object to be measured using a probe, includes: a manual operation unit configured to be capable of executing a measurement element specifying operation to bring the probe into contact with measuring points on a measurement element, and a measurement element confirming operation to indicate an end of the measurement element specifying operation, for each of the one or more measurement elements by manual operation; a coordinate value acquisition unit configured to acquire coordinate values of the measuring points with which the probe is brought into contact; a first intermediate point setting unit configured to set, each time when the coordinate value acquisition unit acquires the coordinate values of one measuring point of the measuring points, a first intermediate point at a position that is offset from the one measuring point in a direction opposite a contact direction of the probe with the one measuring point, based on the coordinate values of the one measuring point and on the contact direction; a second intermediate point setting unit configured to set as a second intermediate point, a position of the probe when the measurement element confirming operation is executed; a third intermediate point setting unit configured to acquire a moving locus of the probe during movement of the probe according to the manual operation, approximate the moving locus by a plurality of straight lines, and set a third intermediate point at an intersection point between the straight lines that are different from each other; and a program generation unit configured to generate a measurement program representing a measuring route of the probe based on the coordinate values of the measuring points acquired by the coordinate value acquisition unit, coordinate values of the second intermediate point set by the second intermediate point setting unit, and coordinate values of the third intermediate point set by the third intermediate point setting unit.

In the three-dimensional coordinate measuring machine according to another aspect of the present disclosure, the manual operation unit is capable of executing a retreating operation to retreat the probe by manual operation from the object to be measured to a replacement position where the probe is replaceable, the three-dimensional coordinate measuring machine further comprises a fourth intermediate point setting unit configured to set as a fourth intermediate point, the replacement position when the manual operation unit executes the retreating operation, and in a case where the manual operation unit executes the retreating operation, the program generation unit generates the measurement program based on the coordinate values of the measuring points, the coordinate values of the second intermediate point, the coordinate values of the third intermediate point, and coordinate values of the fourth intermediate point set by the fourth intermediate point setting unit.

The present disclosure enables anyone to easily and automatically generate a measurement program free from possibility of malfunction.

BRIEF DESCRIPTION OF THE DRAWINGS

FIG. 10 is a table showing the calculation result of the fitting error by the third intermediate point setting unit;

DETAILED DESCRIPTION OF THE PREFERRED EMBODIMENTS

Configuration of Three-Dimensional Coordinate Measuring Machine

Figure 1:
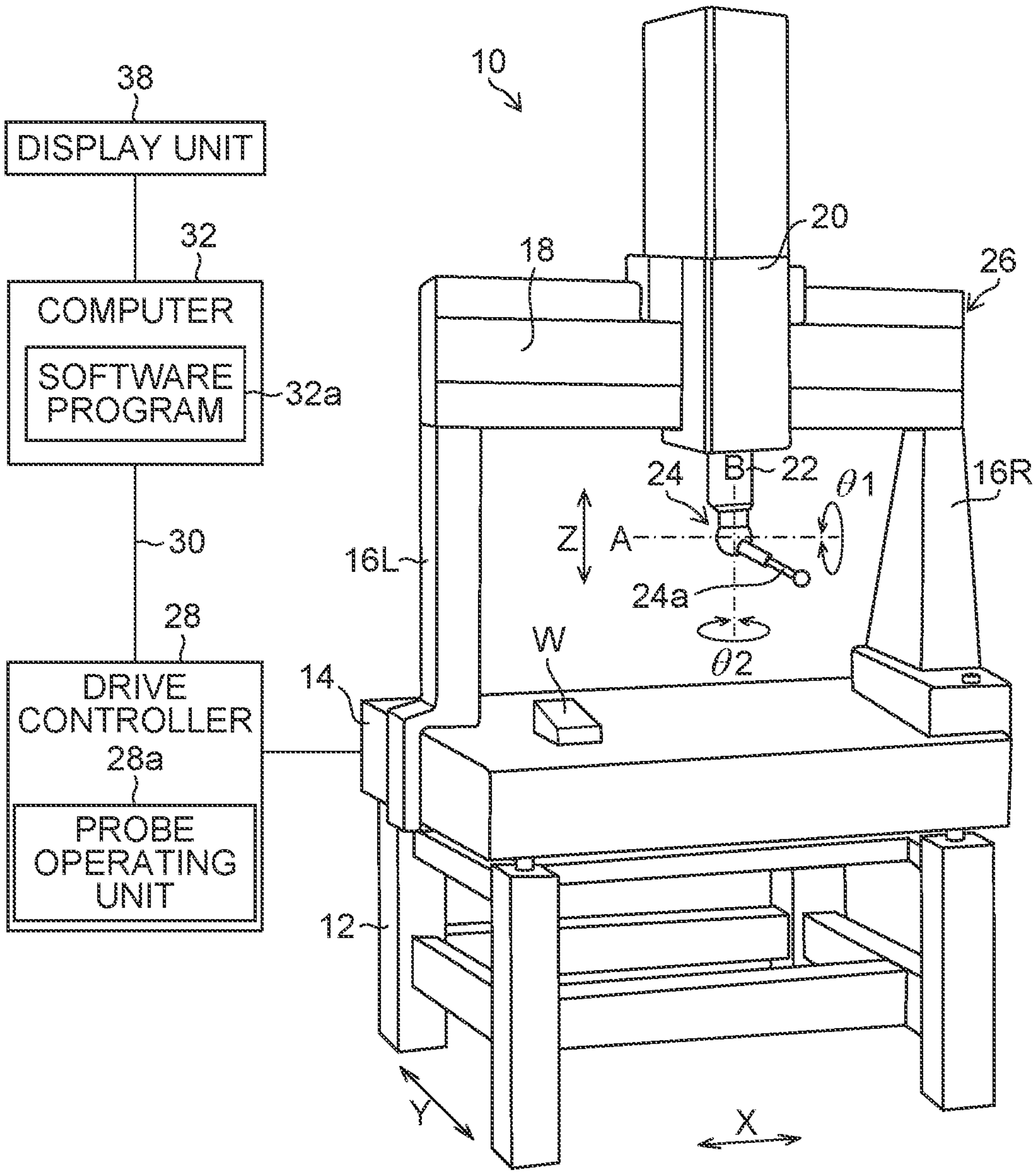
FIG. 1 is an external perspective view of a three-dimensional coordinate measuring machine.

FIG. 1 is an external perspective view of a three-dimensional coordinate measuring machine (CMM: coordinate measuring machine) 10. The three-dimensional coordinate measuring machine 10 measures shapes, or the like, of all the measurement elements (for example, holes, protrusions, or grooves) of a workpiece W, which is an object to be measured, while displacing a position and an attitude of a probe 24*a*. The number of measurement elements of the workpiece W (one or more) is not particularly limited, and description is herein given on the assumption that there are two or more measurement elements. In addition, XYZ axes in FIG. 1 correspond to a machine coordinate system that is a coordinate system determined based on a machine coordinate origin that is inherent to the three-dimensional coordinate measuring machine 10.

As shown in FIG. 1, the three-dimensional coordinate measuring machine 10 includes a frame 12, a table 14 (surface plate) mounted on the frame 12, a right Y-carriage 16R and a left Y-carriage 16L erected on both ends of the table 14, and an X-guide 18 that connects the upper parts of the right Y-carriage 16R and the left Y-carriage 16L. The right Y-carriage 16R, the left Y-carriage 16L, and the X-guide 18 constitute a gantry-style (portal type) frame 26.

Sliding surfaces are formed on an upper surface and side surfaces at both ends of the table 14, along a Y-axis direction. The right Y-carriage 16R and the left Y-carriage 16L may slide on the sliding surfaces. Further, the right Y-carriage 16R and the left Y-carriage 16L are provided with air bearings (illustration omitted) at positions facing the respective sliding surfaces of the table 14. Thus, the right Y-carriage 16R and left Y-carriage 16L are freely movable along the Y-axis together with the X-guide 18.

The X-guide 18 is equipped with an X-carriage 20. The X-guide 18 has a sliding surface formed along an X-axis direction. The X-carriage 20 may slide on the sliding surface. The X-carriage 20 is provided with an air bearing (illustration omitted) at a position facing the sliding surface of the X-guide 18. Thus, the X-carriage 20 are freely movable along the X-guide 18 (along an X-axis direction).

The X-carriage 20 is equipped with a Z-carriage (also referred to as a Z-spindle) 22. The X-carriage 20 is also provided with a Z-axis guiding air bearing (not shown) to guide the Z-carriage 22 in a Z-axis direction. Accordingly, the X-carriage 20 holds the Z-carriage 22 so as to be movable in the Z-axis direction.

A probe head 24 is, for example, a five-axis simultaneous control probe head with a stepless positioning mechanism. The probe head 24 holds a contact-sensitive, touch trigger probe 24*a*. The probe 24*a* includes a publicly known stylus and a contactor. The type of the probe 24*a* is not particularly limited.

The probe head 24 is provided with a probe drive unit 35 (see FIG. 2), such as a motor, which rotates the probe 24*a* around a rotation axis A and around a rotation axis B. The rotation axis A and the rotation axis B are perpendicular to each other. Thus, it is possible to perform stepless adjustment of a rotation angle θ1 around the rotation axis A of the probe 24*a* and a rotation angle θ2 around the rotation axis B of the probe 24*a*. As a result, the attitude of the probe 24*a* can be optionally displaced (rotated).

The three-dimensional coordinate measuring machine 10 is also provided with an XYZ drive unit 36 (see FIG. 2), such as a motor, which includes a Y-axis drive unit that moves the gantry-style frame 26 in the Y-axis direction, an X-axis drive unit that moves the X-carriage 20 in the X-axis direction, and a Z-axis drive unit that moves the Z-carriage 22 in the Z-axis direction. Thus, it is possible to move the probe head 24 and the probe 24*a* in three-axis directions (XYZ-axis directions) perpendicular to each other. The probe drive unit 35 and the XYZ drive unit 36 can freely displace the position and the attitude of the probe 24*a*, so that the probe 24*a* can be optionally displaced (moved and rotated).

At an end of the table 14 on the side of the right Y-carriage 16R, a Y-axis direction linear scale (not shown) is provided. The X-guide 18 is provided with an X-axis direction linear scale (not shown), and the Z-carriage 22 is provided with a Z-axis direction linear scale (not shown).

Meanwhile, the right Y-carriage 16R is provided with a Y-axis direction position detection head (not shown) that reads the Y-axis direction linear scale. The X-carriage 20 is provided with an X-axis direction position detection head (not shown) and a Z-axis direction position detection head (not shown) that read the X-axis direction linear scale and the Z-axis direction linear scale, respectively. The probe head 24 is further provided with rotation angle detection units (not shown), such as rotary encoders, which detect the rotation angles θ1 and θ2 of the probe 24*a*, respectively. When the tip (contactor) of the probe 24*a* comes into contact with a measuring point (a point required to measure the shape of each measurement element) of each measurement element (such as straight lines, round holes, flat surfaces, and spheres) of the workpiece W, coordinate values of the measuring point in the XYZ-axis directions can be detected based on the detection results of the XYZ-axis direction position detection heads and the detection results of the rotation angle detection units.

The three-dimensional coordinate measuring machine 10 includes a drive controller 28 that controls the probe drive unit 35 and the XYZ drive unit 36 shown in FIG. 2 described later to control the movement of the probe head 24, that is, displacement of the position and the attitude of the probe 24*a*. Here, the three-dimensional coordinate measuring machine 10 has an automatic measurement mode that automatically executes measurement of each measurement element of the workpiece W, and a manual measurement mode that manually executes the measurement. Therefore, in the automatic measurement mode, the drive controller 28 controls the probe drive unit 35 and the XYZ drive unit 36 under the control of a computer 32 described later to displace the position and the attitude of the probe 24*a*.

The drive controller 28 also includes a probe operating unit 28*a* (corresponding to the manual operation unit of the present disclosure), such as a joystick, for manually operating the displacement of the position and the attitude of the probe 24*a*. Therefore, in the manual measurement mode, the drive controller 28 displaces the position and the attitude of the probe 24*a* by controlling the probe drive unit 35 and the XYZ drive unit 36 in response to an operation input to the probe operating unit 28*a*.

The drive controller 28 is connected to a touch detection sensor (not shown) of the contact-sensitive, touch trigger probe 24*a*, the XYZ-axis direction detection heads (not shown), and the rotation angle detection units (not shown). The moment when the drive controller 28 detects that the probe 24*a* touches the measuring point of each measurement element of the workpiece W by using the touch detection sensor, the drive controller 28 acquires detection results of the XYZ-axis direction detection heads and each of the rotation angle detection units to detect coordinate values (three-dimensional coordinate values) of the measuring point in the XYZ-axis directions. The coordinate values of the measuring point in the XYZ-axis directions are output to the computer 32 from the drive controller 28.

The computer 32 is communicably connected to the drive controller 28 through various communication interfaces 30 such as a local area network (LAN). The computer 32 functions as a control device of the three-dimensional coordinate measuring machine 10 together with the drive controller 28 described above, and controls shape measurement of all the measurement elements of the workpiece W and generation of a measurement program 37 (see FIG. 2) or the like.

A software program 32*a* is installed on the computer 32. The computer 32 executes the software program 32*a* to generate the measurement program 37 (see FIG. 2) representing a measuring route of the probe 24*a* [for example, the measuring order of each measurement element, the coordinate values indicating all the measuring points for each measurement element, and the coordinate values of intermediate points that are points on the moving route of the probe 24*a*]. In the automatic measurement mode of the three-dimensional coordinate measuring machine 10, the computer 32 drives the probe drive unit 35 and the XYZ drive unit 36 shown in FIG. 2 described later, through the drive controller 28, based on the measurement program 37. As a result, the computer 32 acquires the coordinate values of all the measuring points for each measurement element of the workpiece W by the probe 24*a*, and executes shape calculation or the like of each measurement element.

Meanwhile, in the manual measurement mode of the three-dimensional coordinate measuring machine 10, the computer 32 displays the positions of all the measuring points for each measurement element on the display unit 38 based on the measurement program 37 (see FIG. 2) described later. Hence, a user operates the probe operating unit 28*a* according to the indication on the display unit 38 and drives the probe drive unit 35 and the XYZ drive unit 36 shown in FIG. 2 described later through the drive controller 28, so that the coordinate values of all the measuring points for each measurement element of the workpiece W are obtained with the probe 24*a*. As a result, the computer 32 can execute the shape calculation of each measurement element.

The display unit 38 is connected to the computer 32. The computer 32 displays various information in the three-dimensional coordinate measuring machine 10, such as coordinate values of the measuring points for each measurement element, operation instructions, and the like, on the display unit 38 in the manual measurement mode (and also in the automatic measurement mode). The computer 32 also displays various menu screens (see, for example, FIGS. 3 and 12) on the display unit 38, when generating the measurement program 37 as described later.

Functions of Computer

Figure 2:
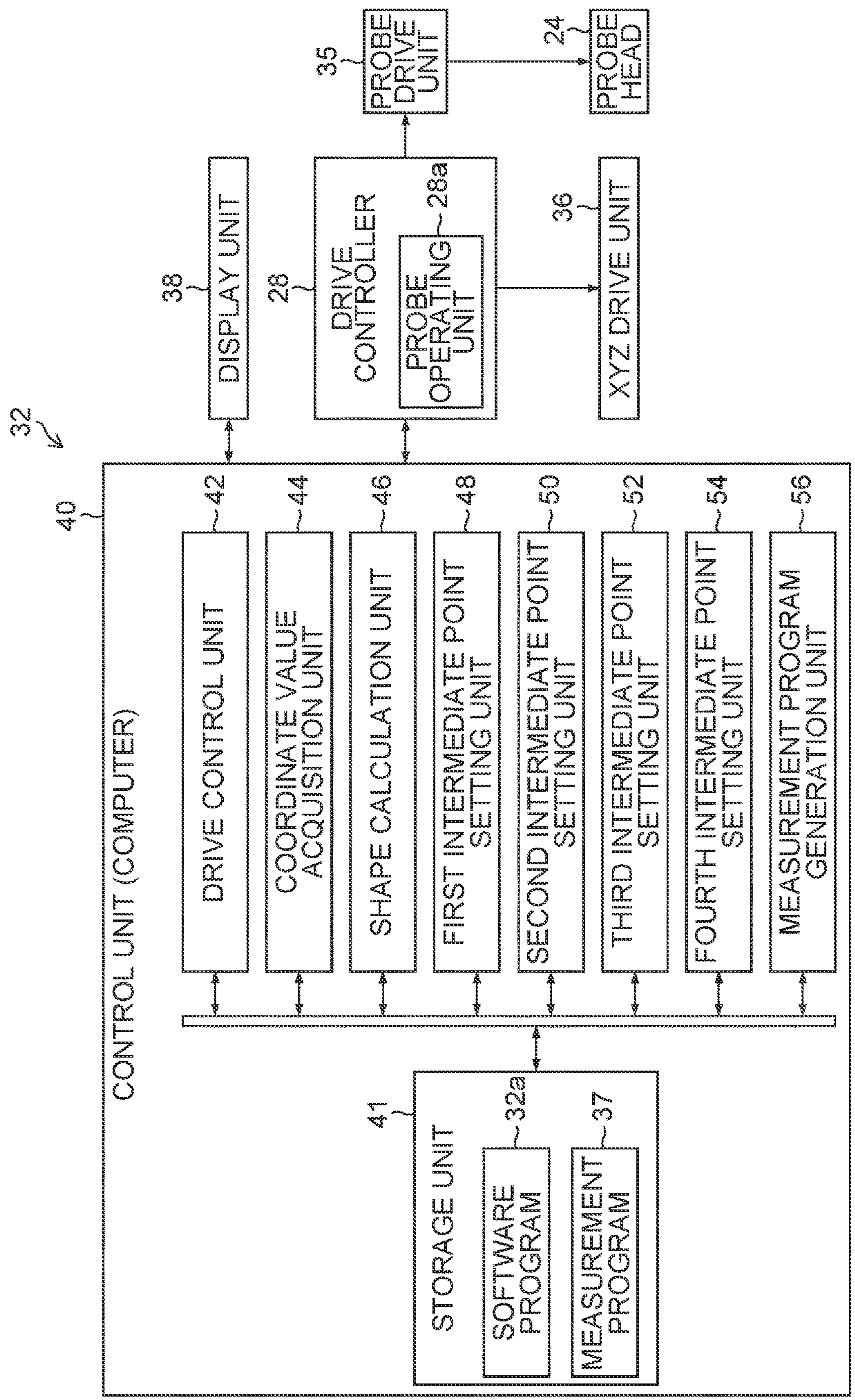
FIG. 2 is a functional block diagram of a computer.

FIG. 2 is a functional block diagram of the computer 32. As shown in FIG. 2, the computer 32 includes a control unit 40 that comprehensively controls the operation of each unit of the three-dimensional coordinate measuring machine 10.

The control unit 40 includes an arithmetic circuit constituted of various processors, a memory, and the like. Various processors include a central processing unit (CPU), a graphics processing unit (GPU), an application specific integrated circuit (ASIC), and a programmable logic device [for example, simple programmable logic devices (SPLDs), complex programmable logic devices (CPLDs), and field programmable gate arrays (FPGAs)]. The various functions of the control unit 40 may be implemented by one processor, or may be implemented by processors of the same type or different types.

The control unit 40 also includes a storage unit 41 that stores a software program 32*a* and the measurement program 37 described later. When measuring each measurement element of the workpiece W, the control unit 40 executes the software program 32*a* in the storage unit 41, to function as a drive control unit 42, a coordinate value acquisition unit 44 and a shape calculation unit 46. When generating the measurement program 37 that is executed before measurement of each measurement element of the workpiece W, the control unit 40 executes the software program 32*a* to function as the coordinate value acquisition unit 44 as well as a first intermediate point setting unit 48, a second intermediate point setting unit 50, a third intermediate point setting unit 52, a fourth intermediate point setting unit 54, and a measurement program generation unit 56.

The drive control unit 42 operates in the automatic measurement mode described above. The drive control unit 42 drives the probe drive unit 35 and the XYZ drive unit 36 through the drive controller 28 based on the measurement program 37, which is described later, in the storage unit 41 so as to bring the probe 24*a* into contact with all the measuring points for each measurement element of the workpiece W.

During measurement of each measurement element of the workpiece W (in the automatic measurement mode and the manual measurement mode), each time when the probe 24*a* comes into contact with a measuring point of each measurement element of the workpiece W, the coordinate value acquisition unit 44 acquires the coordinate values of the measuring point from the drive controller 28 and outputs the coordinate values to the shape calculation unit 46.

The shape calculation unit 46 calculates the shape of the measurement element based on the coordinate values of all the measuring points of the corresponding measurement element acquired by the coordinate value acquisition unit 44, for each measurement element of the workpiece W. Since a specific calculation method of the shape of the measurement element is a publicly known technology, the detailed description thereof is omitted here.

(Generation of Measurement Program)

Figure 3:
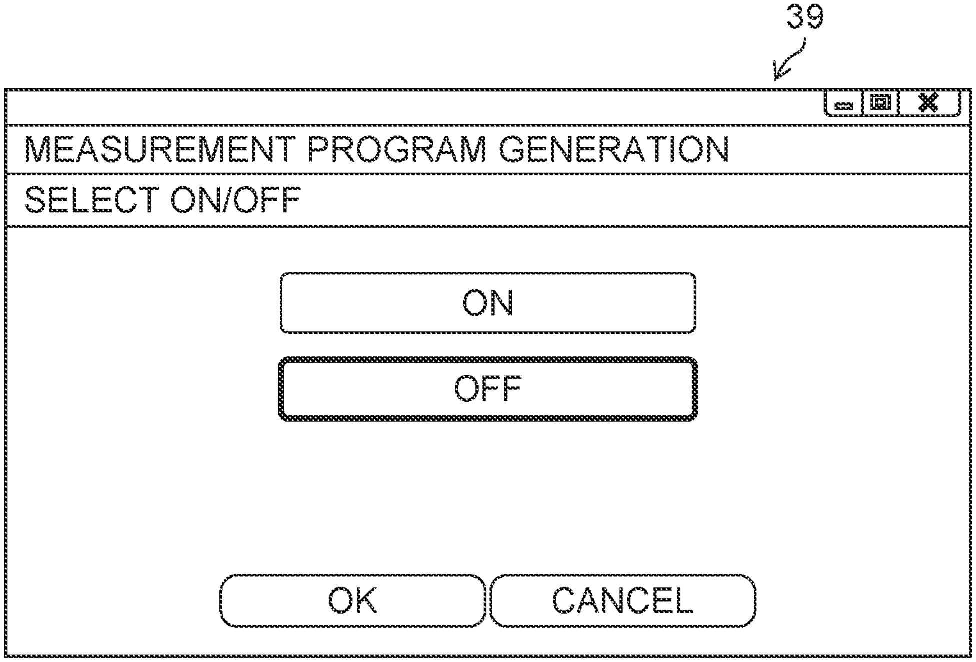
FIG. 3 is an explanatory view showing an example of a start screen for measurement program generation displayed on a display unit.

FIG. 3 is an explanatory view showing an example of a generation start screen 39 for generating the measurement program 37 displayed on the display unit 38. As shown in FIG. 3 and FIG. 2 described above, when the user executes a generation start operation of the measurement program 37 on a generation start screen 39 displayed on the display unit 38, the control unit 40 functions as the coordinate value acquisition unit 44, the first intermediate point setting unit 48, the second intermediate point setting unit 50, the third intermediate point setting unit 52, the fourth intermediate point setting unit 54, and the measurement program generation unit 56.

After execution of the generation start operation of the measurement program 37, the user operates the probe operating unit 28*a* and performs a teaching operation to acquire the coordinates of all the measuring points for each measurement element of the workpiece W by manual operation. While the teaching operation, the coordinate value acquisition unit 44 acquires the coordinate values of each measuring point, and the first intermediate point setting unit 48, the second intermediate point setting unit 50, the third intermediate point setting unit 52, and the fourth intermediate point setting unit 54 automatically set intermediate points, which are points on the moving route of the probe 24*a*, to optimal positions. Thus, the measurement program generation unit 56 generates the measurement program 37.

Figure 4:
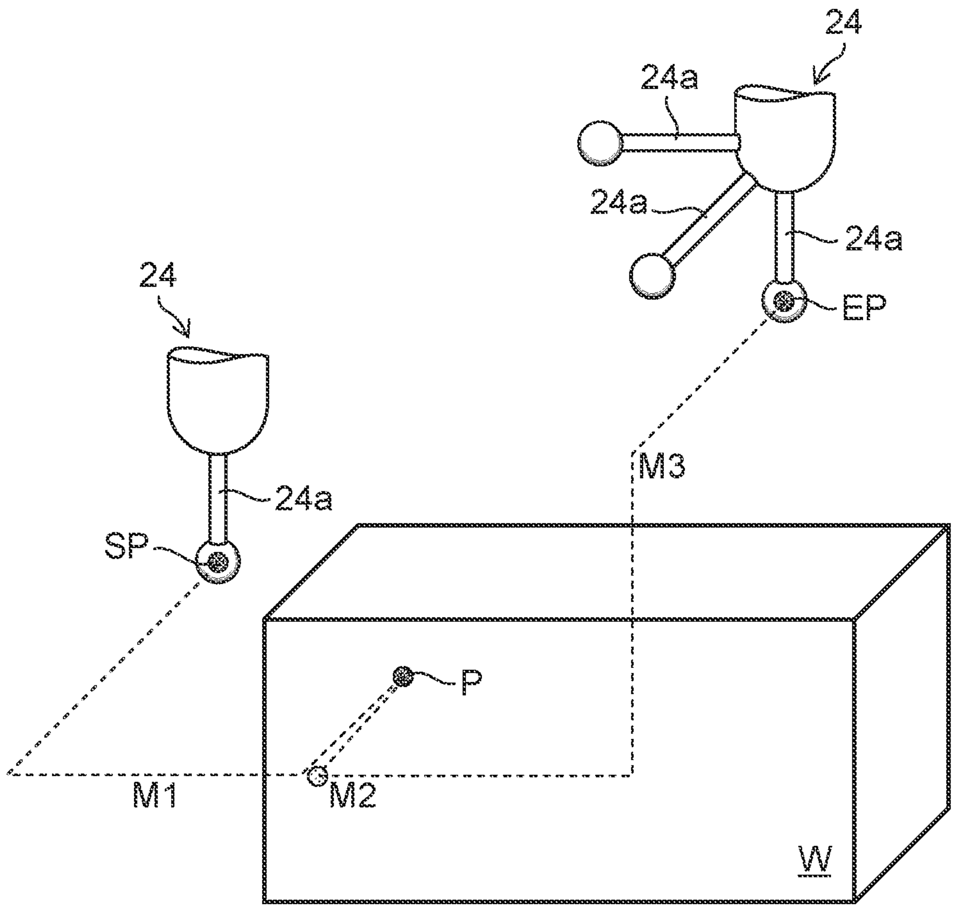
FIG. 4 is an explanatory view for describing a teaching operation for one measurement element of a workpiece.

FIG. 4 is an explanatory view for describing the teaching operation for one measurement element of the workpiece W. In FIG. 4, in order to avoid complicated description, only one of measuring points P of a measurement element (a planar element here) is illustrated as a representative example.

As shown in FIG. 4, the teaching operation includes at least a measurement element specifying operation M1 and a termination operation M2 (corresponding to the measurement element confirming operation of the present disclosure).

The measurement element specifying operation M1 is an operation in which the user operates the probe operating unit 28*a* to bring the probe 24*a* into contact with all the measuring points P of the measurement element while moving the probe 24*a*. In the drawings, reference character SP designates an initial position (start position) of the probe 24*a* before the start of the teaching operation.

The termination operation M2 is an operation to terminate the measurement element specifying operation M1 and confirm the measurement element (all the measuring points P thereof). The termination operation M2 includes, for example, a moving operation and an execution operation. In the moving operation, the user operates the probe operating unit 28*a* to retreat the probe 24*a* from each of the measuring points P after the end of the measurement element specifying operation M1. In the execution operation, the user inputs execution of the termination operation M2 to the probe operating unit 28*a*. Note that the moving operation may be omitted.

In a case where the workpiece W has two or more measurement elements, the measurement element specifying operation M1 and the termination operation M2 are repeatedly executed for each of the measurement elements according to the measuring order of the measurement elements specified by the user.

Depending on the types of the measurement elements of the workpiece W, it may be necessary to replace the probe 24*a*. Therefore, in a case where it is necessary to replace the probe 24*a* of the probe head 24, a retreating operation M3 is executed as a teaching operation before starting the measurement element specifying operation M1 for the next measurement element. The retreating operation M3 is an operation in which the user operates the probe operating unit 28*a* to retreat the probe 24*a* from the workpiece W to a replacement position EP where the probe 24*a* can be replaced.

When the teaching operation ends, the user inputs an end operation (a completion operation) of the teaching operation to the probe operating unit 28*a*, though the illustration thereof is omitted.

Figure 5:
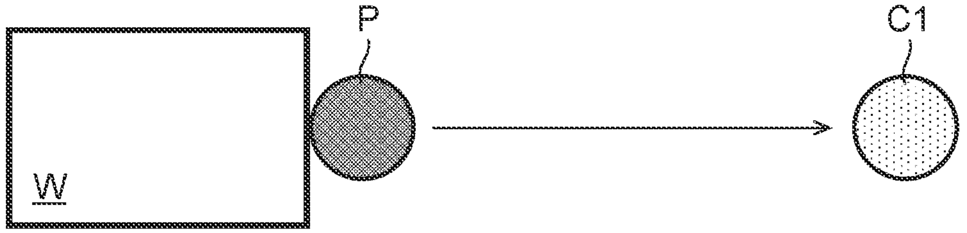
FIG. 5 is an explanatory view for describing acquisition of coordinate values of a measuring point by a coordinate value acquisition unit and setting of a first intermediate point by a first intermediate point setting unit during execution of a measurement element specifying operation.

FIG. 5 is an explanatory view for describing acquisition of the coordinate values of the measuring point P by the coordinate value acquisition unit 44 and setting of a first intermediate point C1 by the first intermediate point setting unit 48 during execution of the measurement element specifying operation M1. As shown in FIG. 5 and FIG. 2 described above, each time when the probe 24*a* comes into contact with a measuring point P of a measurement element (a planar element here) of the workpiece W by the measurement element specifying operation M1, the coordinate value acquisition unit 44 acquires the coordinate values of the measuring point P from the drive controller 28 and outputs the coordinate values of the measuring point P to the first intermediate point setting unit 48 and to the measurement program generation unit 56.

Each time when the probe 24*a* comes into contact with the measuring point P by the measurement element specifying operation M1, the first intermediate point setting unit 48 sets a first intermediate point C1. Specifically, when the probe 24*a* comes into contact with the measuring point P, the first intermediate point setting unit 48 acquires the coordinate values of the measuring point P from the coordinate value acquisition unit 44. Further, the first intermediate point setting unit 48 continuously acquires movement vector information indicating a movement vector of the probe 24*a* from the drive controller 28 during execution of the measurement element specifying operation M1. As a result, the first intermediate point setting unit 48 can determine a contact direction of the probe 24*a* with respect to a measuring point P when the probe 24*a* comes into contact with the measuring point P.

Next, the first intermediate point setting unit 48 sets the first intermediate point C1 at a position that is offset from the measuring point P in a direction opposite the contact direction (movement vector), based on the coordinate values of the measuring point P and the contact direction of the probe 24*a* with respect to the measuring point P. For example, provided that the coordinate values of the measuring point P is (X, Y, Z), the movement vector is (I, J, K), and a set value of the offset amount is L, the first intermediate point setting unit 48 calculates the coordinate values of the first intermediate point C1 by "(X, Y, Z)−L(I, J, K)". The user can appropriately change the set value (L) of the offset amount. Here, the movement vector is a unit vector.

Figure 6:
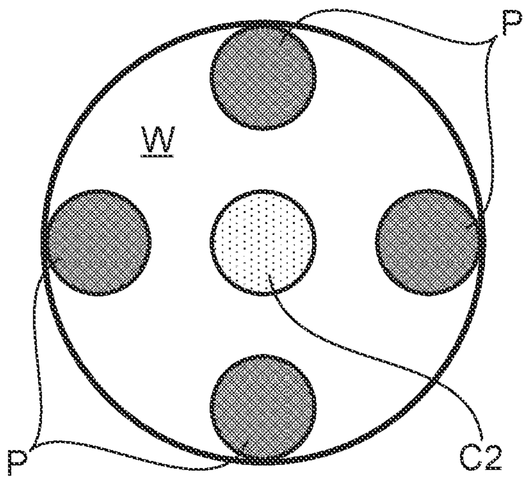
FIG. 6 is an explanatory view for describing setting of a second intermediate point by a second intermediate point setting unit.

FIG. 6 is an explanatory view for describing setting of a second intermediate point C2 by the second intermediate point setting unit 50. As shown in FIG. 6 and FIG. 2 described above, when the execution operation of the termination operation M2 is performed after the end of the measurement element specifying operation M1 for the measurement element (the circular hole element here) of the workpiece W, the second intermediate point setting unit 50 acquires the coordinate values of the probe 24*a* from the drive controller 28 or the like, and sets the coordinate values as the second intermediate point C2.

Figure 7:
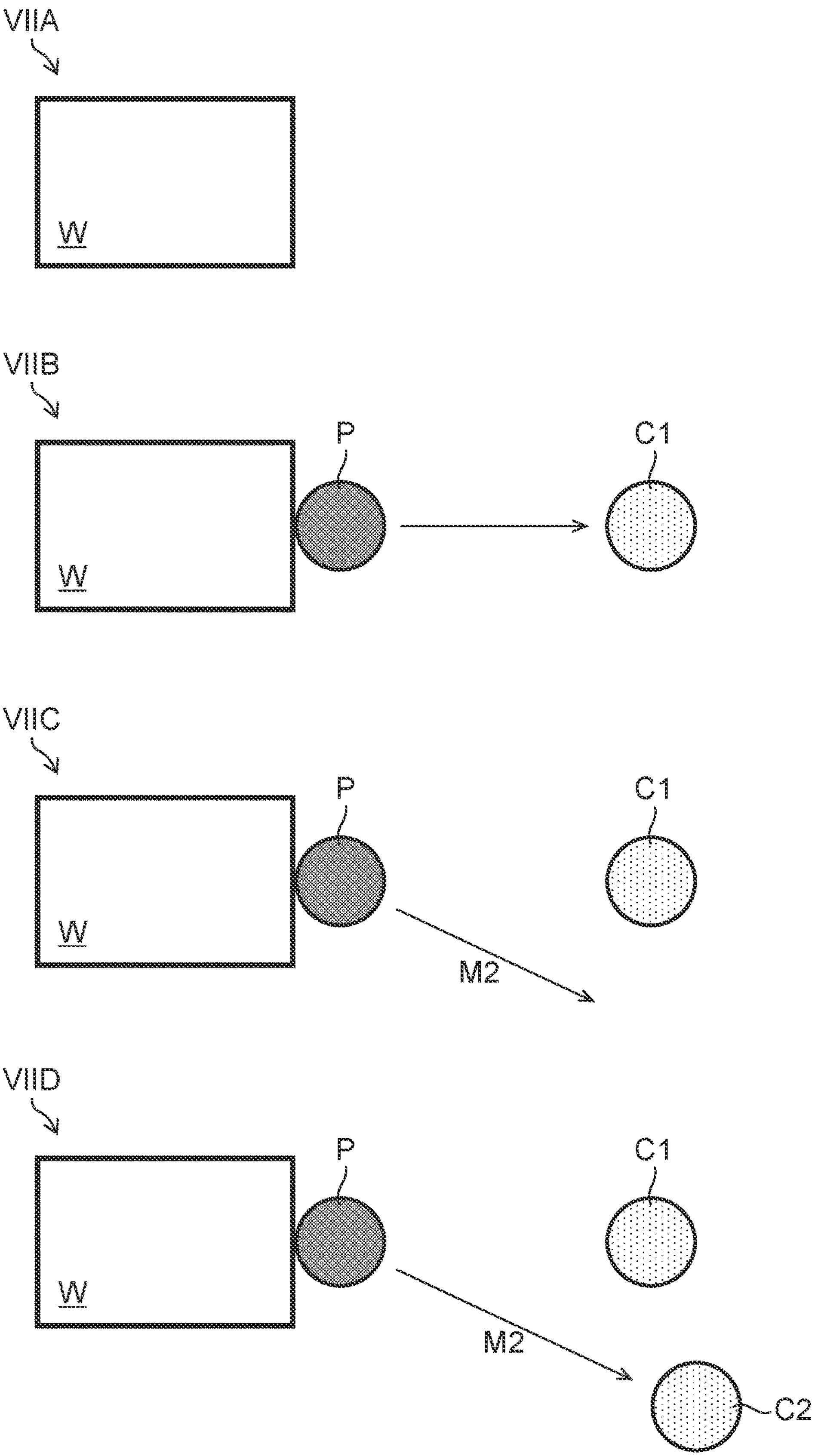
FIG. 7 is an explanatory view showing an example of a moving locus of a probe during execution of the teaching operation.

FIG. 7 is an explanatory view for describing the first intermediate point C1 and the second intermediate point C2 set by the measurement element specifying operation M1 and the termination operation M2 for one measurement element of the workpiece W. In FIG. 7, in order to avoid complicated description, only one of the measuring points P of a measurement element (a planar element here) is illustrated as a representative example.

As shown by reference characters VIIA and VIIB in FIG. 7, when the probe 24*a* is brought into contact with the measuring point P of the measurement element of the workpiece W by the measurement element specifying operation M1, the first intermediate point setting unit 48 sets the first intermediate point C1 based on the coordinate values of the measuring point P acquired from the coordinate value acquisition unit 44 and the movement vector information acquired from the drive controller 28.

Then, after the moving operation of the probe 24*a* (the moving operation to an execution position of the termination operation M2) is executed as shown by reference character VIIC in FIG. 7, the execution operation of the termination operation M2 is executed as shown by reference VIID in FIG. 7. Consequently, the second intermediate point setting unit 50 sets the coordinates of the probe 24*a* at the time of the execution operation, as the second intermediate point C2.

Figure 8:
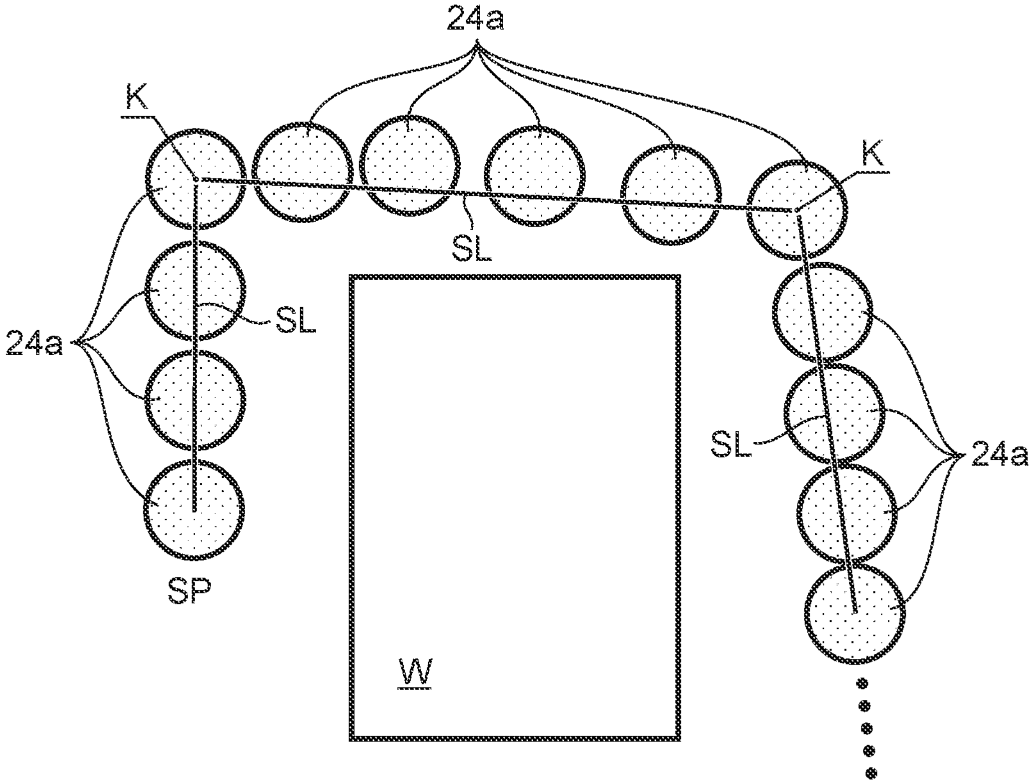
FIG. 8 is an explanatory view for describing calculation of a fitting straight line and calculation of fitting error by a third intermediate point setting unit.

FIG. 8 is an explanatory view showing an example of a moving locus of the probe 24*a* during execution of the teaching operation. As shown in FIG. 8, the third intermediate point setting unit 52 continuously detects the moving locus of the probe 24*a* by, for example, continuously acquiring the movement vector information described above from the drive controller 28, during movement of the probe 24*a* in response to the teaching operation. Then, the third intermediate point setting unit 52 sets the third intermediate point C3 (see FIG. 13 described later) at a predetermined position on the moving locus of the probe 24*a*.

Specifically, the third intermediate point setting unit 52 performs a linear fitting on the moving locus of the probe 24*a* to approximate the moving locus by fitting straight lines SL, which are straight lines, and detects an intersection point K between the fitting straight lines SL, which are different from each other. The method of detecting the intersection point K is described in detail below.

Figure 9:
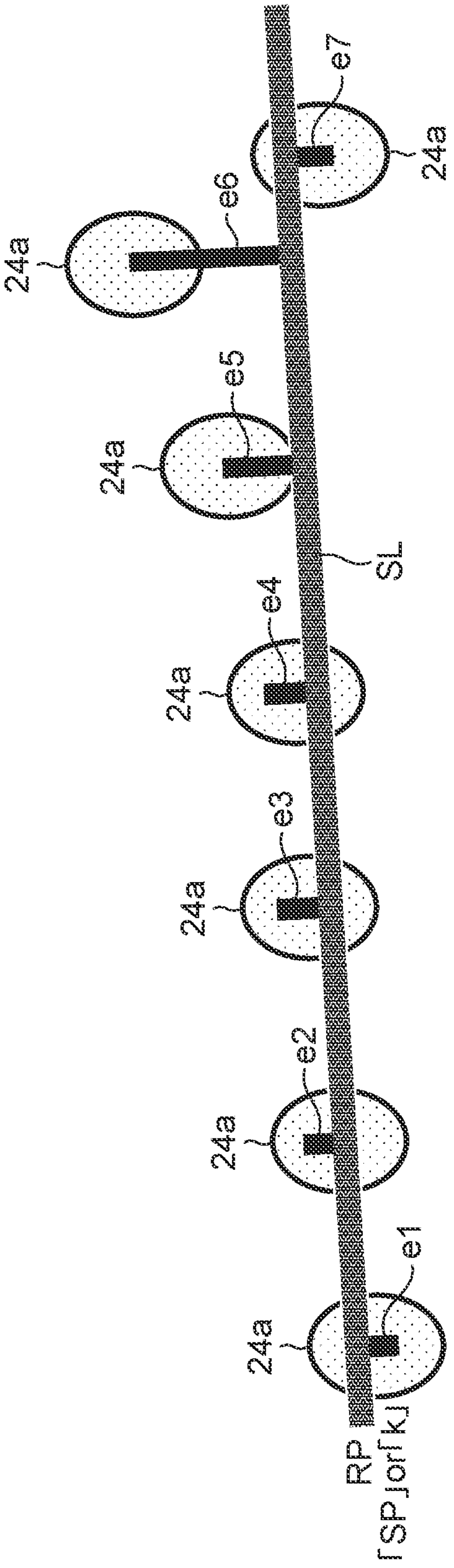
FIG. 9 shows the calculation result of the fitting error by the third intermediate point setting unit.

FIG. 9 is an explanatory view for describing calculation of a fitting straight line SL and calculation of fitting error by the third intermediate point setting unit 52.

As shown in FIG. 9, the third intermediate point setting unit 52 repeatedly executes calculation of a fitting straight line SL for each point on the moving locus of the probe 24*a* from a reference point RP to the current position of the probe 24*a*, based on the movement vector information continuously acquired from the drive controller 28 during movement of the probe 24*a* in response to the teaching operation. Here, the reference point RP is a start point of a linear section of the moving locus of the probe 24*a*. Specifically, the reference point RP is the initial position SP (see FIG. 4) described above until the probe 24*a* reaches a first intersection point K, and after the probe 24*a* reaches the first intersection point K, the reference point RP is a previous intersection point K (see FIG. 8).

Further, the third intermediate point setting unit 52 calculates, each time when calculation of the fitting straight line SL is executed, fitting error between the fitting straight line SL and each point on the moving locus of the probe 24*a*. Specifically, the third intermediate point setting unit 52 first calculates a distance ei ("i" is a natural number indicating the order of each point on the moving locus from the reference point RP) between the fitting straight line SL and each point on the moving locus of the probe 24*a*. As a result, distances e1 to e7 at the respective points on the moving locus of the probe 24*a* are calculated, for example. Here, the distance ei is a vector quantity.

FIG. 10 is a table showing the calculation result of the fitting error by the third intermediate point setting unit 52. As shown in FIG. 10, the third intermediate point setting unit 52 calculates the square root of the distance ei (deviation) at each point, i.e., the standard deviation, as the fitting error based on the calculation result of the distance ei at each point on the moving locus of the probe 24*a* and on the total number of points n, as shown by [Expression 1] below. This yields a fitting error of 1.13457 in the example shown in FIG. 10.

$$\text{fitting error} = \sqrt{\frac{1}{n}\sum e_i^2} \qquad \text{[Expression 1]}$$

Figure 11:
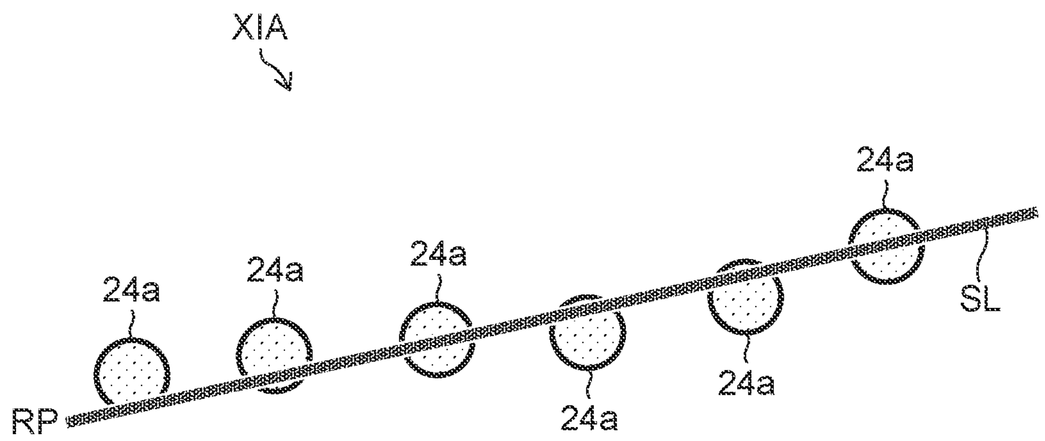
FIG. 11 shows views illustrating examples of results of fitting error calculation by the third intermediate point setting unit, in which a view designated by reference character XIA indicates an example of a case where the result of fitting error calculation is equal to or less than a threshold, and a view designated by reference character XIB indicates an example of a case where the result of the fitting error calculation is larger than the threshold.
Figure 11:
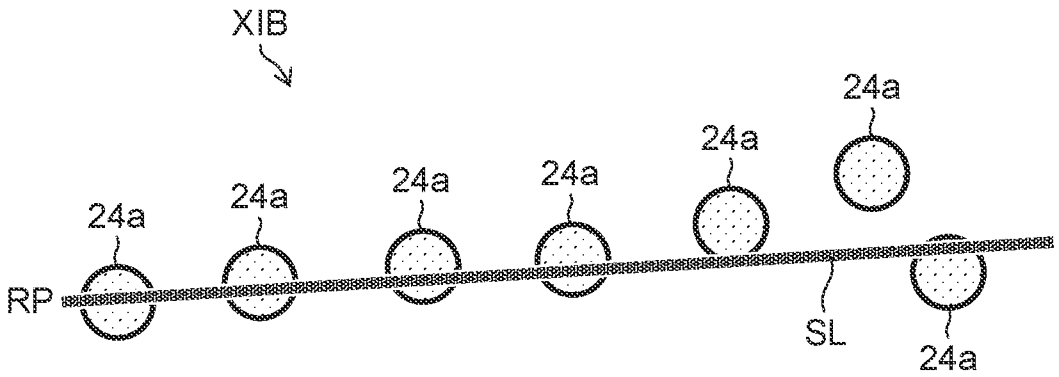

Reference character XIA in FIG. 11 designates a view showing an example of a case where the result of the fitting error calculation by the third intermediate point setting unit 52 is equal to or less than a threshold, and reference character XIB designates a view indicating an example of a case where the result of the fitting error calculation by the third intermediate point setting unit 52 is larger than the threshold.

As shown in FIG. 11, each time when the fitting error calculation is performed, the third intermediate point setting unit 52 determines whether or not the fitting error is larger than the predetermined threshold. When the fitting error is equal to or less than the threshold, the third intermediate point setting unit 52 determines that the probe 24*a* does not yet pass a new intersection point K, i.e., the third intermediate point setting unit 52 determines that the linear section of the moving locus of the probe 24*a* continues as shown by reference character XIA in FIG. 11.

Conversely, when the fitting error is larger than the threshold, the third intermediate point setting unit 52 determines that the probe 24*a* passes the new intersection point K, i.e., the linear section of the moving locus of the probe 24*a* has changed as shown by reference character XIB in FIG. 11. Thus, the third intermediate point setting unit 52 can detect the intersection point K on the moving locus of the probe 24*a*, i.e., the change of the linear section.

Until the end operation of the teaching operation is executed, the third intermediate point setting unit 52 then repeatedly executes calculation of the fitting straight line SL (linear fitting), calculation of fitting error, and determination regarding whether or not the fitting error is larger than the threshold, to detect all the intersection points K (the change of the linear section) on the moving locus of the probe 24*a*.

Figure 12:
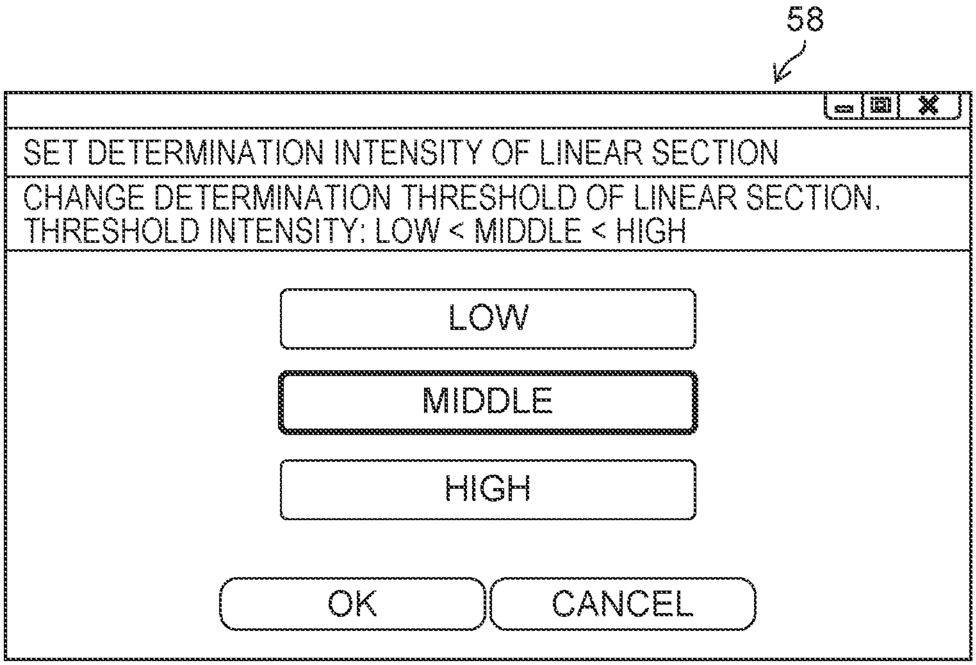
FIG. 12 is an explanatory view for describing a screen for changing the threshold displayed on the display unit.

FIG. 12 is an explanatory view for describing a screen 58 for changing the threshold, which is displayed on the display unit 38. As shown in FIG. 12, the user can change the threshold, which is used for determination by the third intermediate point setting unit 52, on the change screen 58 displayed on the display unit 38. As a result, it is possible to adjust the determination intensity of the linear section in the moving locus of the probe 24*a* (a tolerance range for determining that the linear section is regarded as continuing). In FIG. 12, the threshold can be changed in three stages (low, middle, and high), though the threshold may be changed in two stages or four or more stages.

Figure 13:
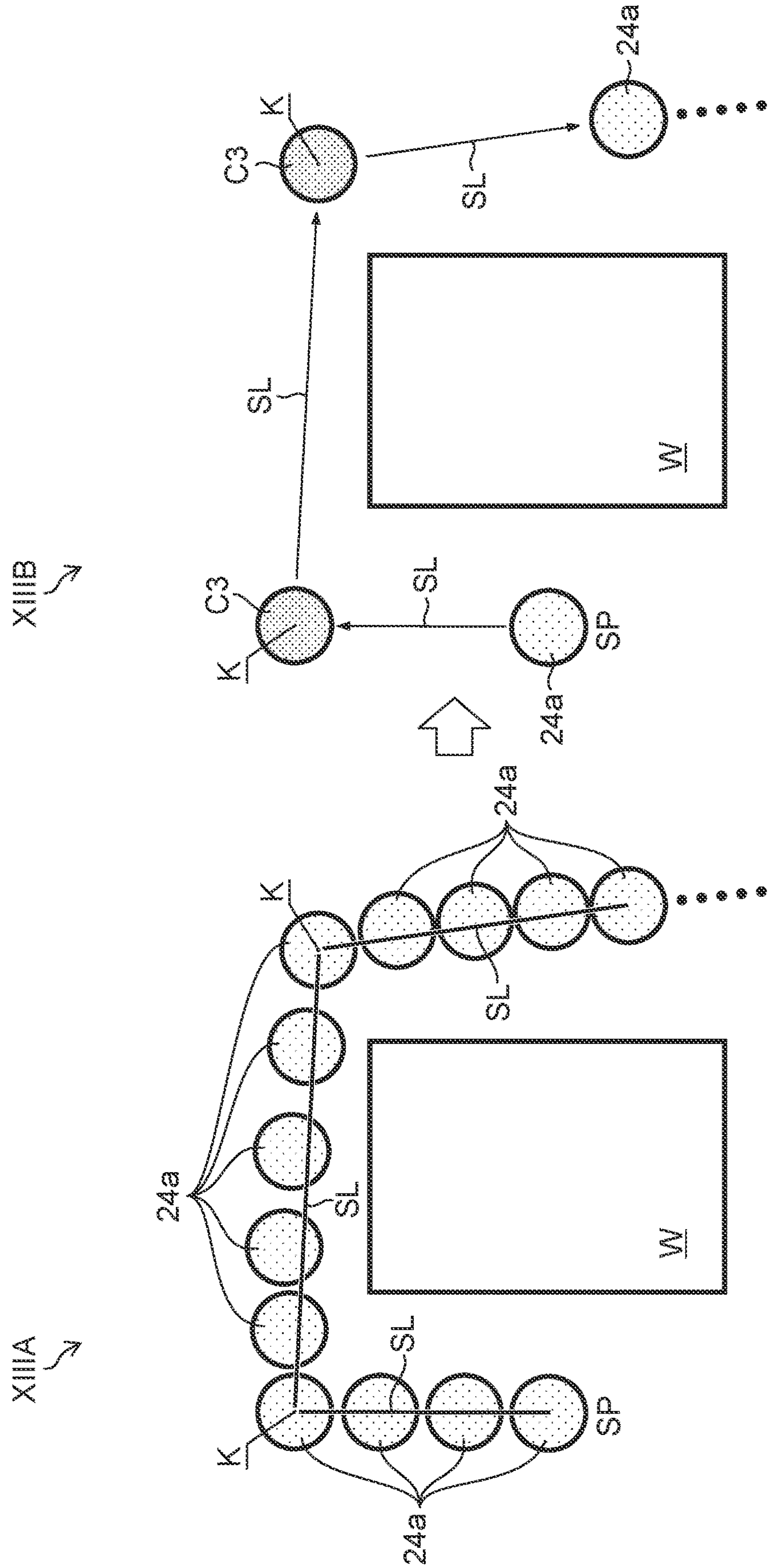
FIG. 13 is an explanatory view for describing setting of the third intermediate point by the third intermediate point setting unit.

FIG. 13 is an explanatory view for describing setting of a third intermediate point C3 by the third intermediate point setting unit 52. As shown by reference characters XIIIA and XIIIB in FIG. 13, each time when the intersection point K (the change in linear section) on the moving locus of the probe 24*a* is detected, the third intermediate point setting unit 52 sets the third intermediate point C3 at the coordinates of the intersection point K. As a result, on an approximate route obtained by approximating the moving locus of the probe 24*a* with fitting straight lines SL, the third intermediate points C3 are set at all the intersection points K between the fitting straight lines SL that are different from each other.

Figure 14:
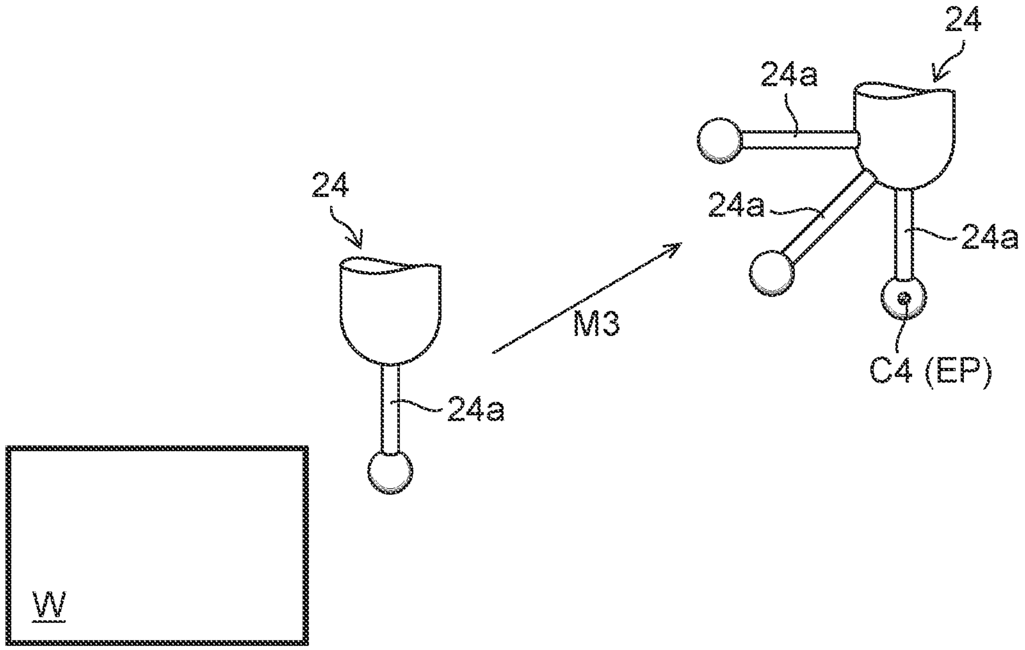
FIG. 14 is an explanatory view for describing setting of a fourth intermediate point by a fourth intermediate point setting unit.

FIG. 14 is an explanatory view for describing setting of a fourth intermediate point C4 by the fourth intermediate point setting unit 54. As shown in FIG. 14 and FIG. 2 described above, when the retreating operation M3 is executed as the teaching operation and the probe 24*a* is moved to the replacement position EP (see FIG. 4), the fourth intermediate point setting unit 54 acquires the coordinate values of the probe 24*a* in the replacement position EP, from the drive controller 28, or the like. Then, the fourth intermediate point setting unit 54 sets the replacement position EP as the fourth intermediate point C4 based on the acquired coordinate values.

Figure 15:
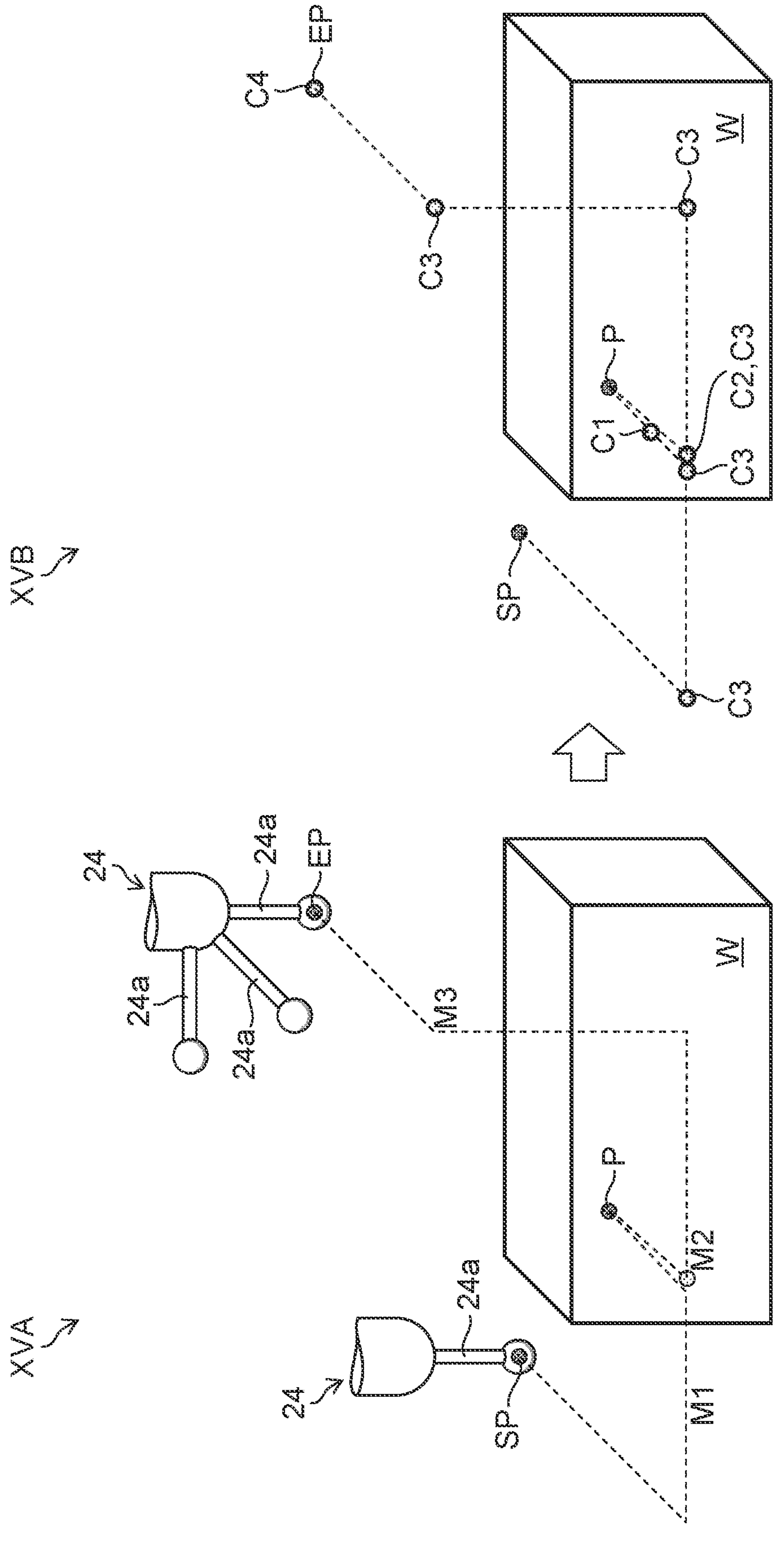
FIG. 15 is an explanatory view for describing generation of the measurement program by a measurement program generation unit.

FIG. 15 is an explanatory view for describing generation of the measurement program 37 by the measurement program generation unit 56. In FIG. 15, in order to avoid complicated description, only a representative example (a planar element here) out of the measurement elements of the workpiece W is illustrated, and in addition, only one of the measuring points P of the measurement element (the planar element) is illustrated as a representative example.

As shown in FIG. 15 and FIG. 2 described above, the measurement program generation unit 56 starts generation of the measurement program 37, after the user performs the teaching operation (the measurement element specifying operation M1, the termination operation M2, and the retreating operation M3) and then executes the end operation of the teaching operation as shown by reference character XVA in FIG. 15.

Specifically, the measurement program generation unit 56 acquires the coordinate values of each measuring point P for each measurement element from the coordinate value acquisition unit 44 as shown by reference character XVB in FIG. 15. The measurement program generation unit 56 also acquires the coordinate values of the first intermediate point C1 set for each measuring point P from the first intermediate point setting unit 48, acquires the coordinate values of the second intermediate point C2 set for each measurement element from the second intermediate point setting unit 50, and acquires the coordinate values of the third intermediate point C3 set for each intersection point K from the third intermediate point setting unit 52. The measurement program generation unit 56 further acquires the coordinate values of the fourth intermediate point C4 from the fourth intermediate point setting unit 54, when the retreating operation M3 is executed.

The measurement program generation unit 56 then generates the measurement program 37 based on the coordinate values of each measuring point P for each measurement element, the coordinate values of the first intermediate point C1 for each measuring point P, the coordinate values of the second intermediate point C2 for each measurement element, the coordinate values of the third intermediate point C3 for each intersection point K, and the coordinate values of the fourth intermediate point C4. For example, the measurement program generation unit 56 generates the measurement program 37 indicating a measuring route along which the probe 24*a* moves in the order that the measuring points P, the second intermediate points C2, the third intermediate points C3, and the fourth intermediate points C4 are each acquired or set. Further, the measurement program generation unit 56 sets the first intermediate point C1 as a moving route point of the probe 24*a* immediately before the probe 24*a* moves toward the corresponding measuring point P. This prevents the probe 24*a* from coming into contact with the measuring point P from an oblique direction.

Operation of Present Embodiment

Figure 16:
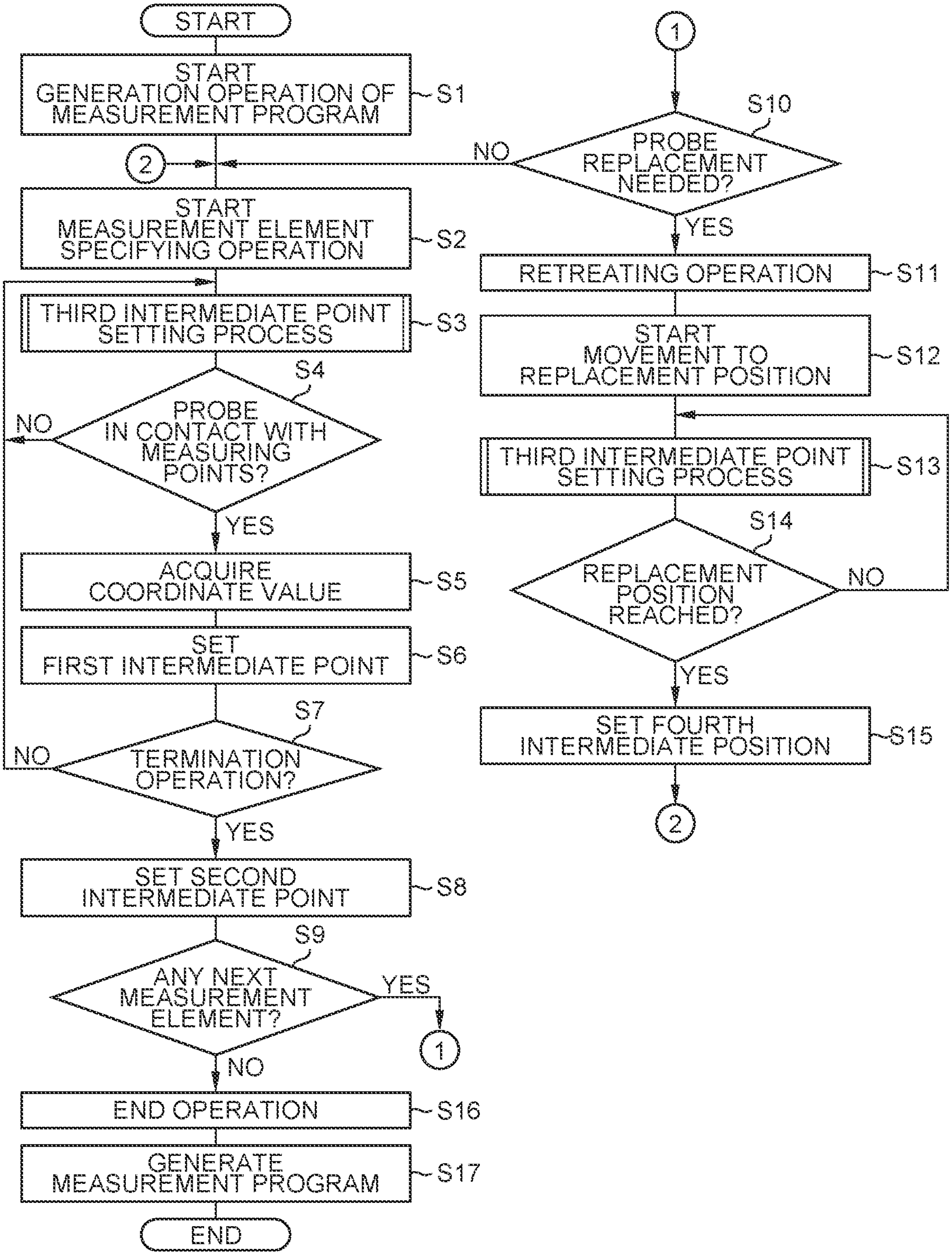
FIG. 16 is a flowchart showing the flow of a generation process of the measurement program by the three-dimensional coordinate measuring machine.

FIG. 16 is a flowchart showing the flow of a generation process of the measurement program 37 (a measurement program generation method) by the three-dimensional coordinate measuring machine 10 having the above configuration. As shown in FIG. 16, the user executes the generation start operation of the measurement program 37 on the generation start screen 39 displayed on the display unit 38 (step S1). As a result, the control unit 40 functions as the coordinate value acquisition unit 44, the first intermediate point setting unit 48, the second intermediate point setting unit 50, the third intermediate point setting unit 52, the fourth intermediate point setting unit 54, and the measurement program generation unit 56, so that the measurement program 37 can be generated in response to the teaching operation of the user.

The user also executes the operation to change the threshold that is used for the determination by the third intermediate point setting unit 52 on the change screen 58 displayed on the display unit 38, if necessary.

When the user starts the teaching operation (the measurement element specifying operation M1) by operating the probe operating unit 28*a* (step S2, corresponding to the manual operation step of the present disclosure), the third intermediate point setting unit 52 starts the process of setting the third intermediate point C3 (step S3, NO in step S4).

Figure 17:
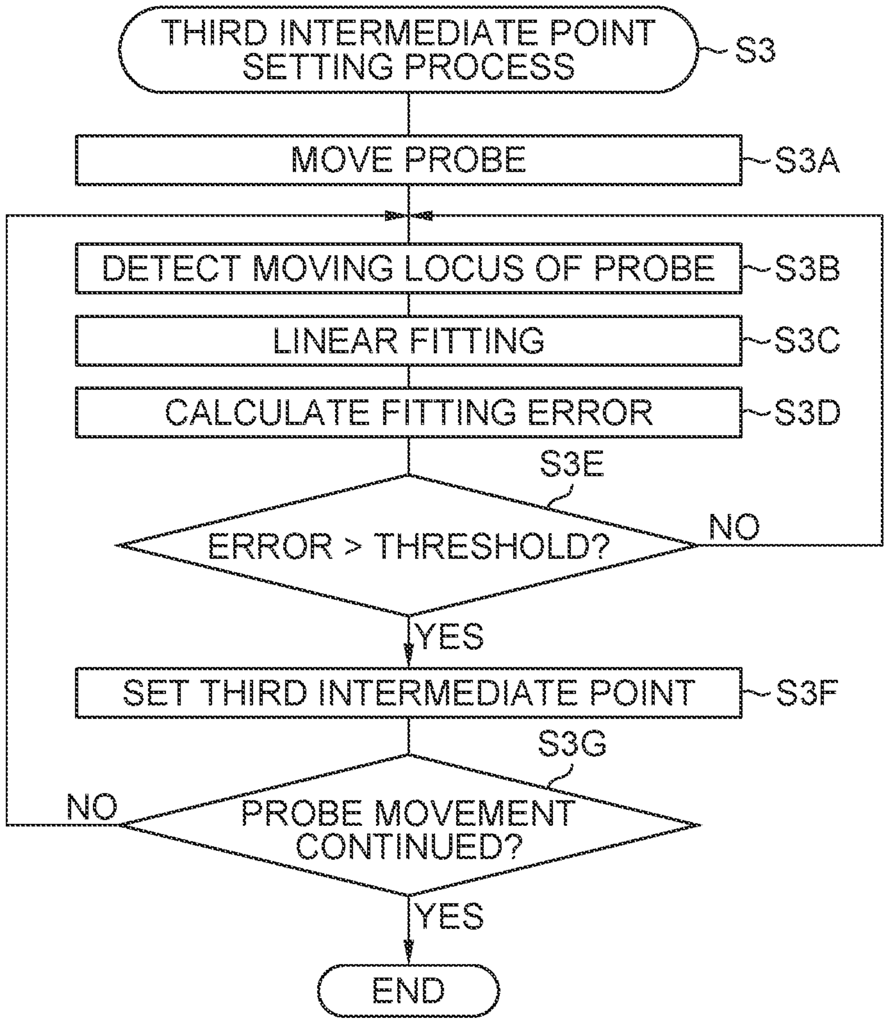
FIG. 17 is a flowchart showing the flow of a third intermediate point setting process by the third intermediate point setting unit.

FIG. 17 is a flowchart showing the flow of the process of setting the third intermediate point C3 by the third intermediate point setting unit 52 (corresponding to the third intermediate point setting step of the present disclosure).

As shown in FIG. 17, while the probe 24*a* is moved toward a first measuring point P of a first measurement element in response to the measurement element specifying operation M1 (step S3A), the third intermediate point setting unit 52 continuously acquires the movement vector information on the probe 24*a* from the drive controller 28. The third intermediate point setting unit 52 continuously detects the moving locus of the probe 24*a* from the reference point RP to the current position of probe 24*a* based on the movement vector information on the probe 24*a* (step S3B).

Then, as shown in the drawings such as FIGS. 9 and 10 described above, the third intermediate point setting unit 52 executes calculation of the fitting straight line SL (linear fitting) for each point on the moving locus of the probe 24*a* (step S3C), calculation of the fitting error (step S3D), and determination regarding whether or not the fitting error is larger than the threshold (step S3E). Note that step S3E corresponds to the determination step of the present disclosure.

In a case where the fitting error is equal to or less than the threshold, the third intermediate point setting unit 52 determines that the probe 24*a* does not yet pass a new intersection point K, i.e., the linear section of the moving locus of the probe 24*a* continues (NO in step S3E). In this case, the process of steps S3B and S3C described above (the repeat calculation step of the present disclosure) and the process of step S3D are repeatedly performed.

Meanwhile, in a case where the fitting error is larger than the threshold, the third intermediate point setting unit 52 determines that the probe 24*a* has passed the new intersection point K, i.e., the linear section of the moving locus of the probe 24*a* has changed (YES in step S3E). Thus, the third intermediate point setting unit 52 can detect the intersection point K on the moving locus of the probe 24*a*. Then, the third intermediate point setting unit 52 sets the third intermediate point C3 at the coordinates of the detected intersection point K (step S3F).

The third intermediate point setting unit 52 then repeatedly executes the process from steps S3B to S3F described above, while the probe 24*a* is continuously moved, that is, while the teaching operation continues (step S3G). Thus, the third intermediate points C3 are set at all the intersection points K on the moving locus of the probe 24*a*.

Back to FIG. 16, when the probe 24*a* comes into contact with the first measuring point P of the first measurement element in response to the measurement element specifying operation M1 (YES in step S4), the coordinate value acquisition unit 44 acquires the coordinate values of the measuring point P from the drive controller 28 (step S5, corresponding to the coordinate value acquisition step of the present disclosure). Then, the coordinate value acquisition unit 44 outputs the coordinate values of the measuring point P to the first intermediate point setting unit 48 and the measurement program generation unit 56.

Next, the first intermediate point setting unit 48 sets the first intermediate point C1 at a position offset from the measuring point P in the direction opposite the contact direction of the probe 24*a*, based on the coordinate values of the measuring point P acquired from the coordinate value acquisition unit 44 as shown in FIG. 5 and so on, and the movement vector information on the probe 24*a* acquired from the drive controller 28 (step S6). Note that step S6 corresponds to the first intermediate point setting step of the present disclosure.

The measurement element specifying operation M1 continues until the probe 24*a* comes into contact with all the measuring points P of the first measurement element, and the process from step S3 to step S6 described above is repeatedly executed (NO in step S7).

Once the user brings the probe 24*a* into contact with all the measuring points P of the first measurement element, the user operates the probe operating unit 28*a* to execute the termination operation M2 (the moving operation and the execution operation) (corresponding to the manual operation step of the present disclosure). When the execution operation of the termination operation M2 is performed, the second intermediate point setting unit 50 sets as the second intermediate point C2 the coordinates of the probe 24*a* during the execution operation of the termination operation M2 as shown in FIG. 15 and so on (step S8, corresponding to the second intermediate point setting step of the present disclosure).

In a case where the workpiece W has one measurement element, the process proceeds to step S16 described later (NO in step S9).

In a case where the measurement element specifying operation M1 is executed for a next measurement element (YES in step S9) and there is no need to replace the probe 24*a* of the probe head 24 in advance (NO in step S10), the above-described process from steps S2 to S8 is repeatedly executed.

On the other hand, in a case where it is necessary to replace the probe 24*a* of the probe head 24 before execution of the measurement element specifying operation M1 for the next measurement element (YES in step S10), the user operates the probe operating unit 28*a* to execute the retreating operation M3 (step S11). As shown in the FIG. 15 and other drawings described above, the probe 24*a* is moved toward the replacement position EP in response to the retreating operation M3 (step S12), and the third intermediate point setting process similar to step S3 described above (see FIG. 17) is executed during the movement of the probe 24*a* (step S13, NO in step S14).

Then, when the probe 24*a* reaches the replacement position EP and the retreating operation M3 is completed (YES in step S14), the fourth intermediate point setting unit 54 acquires the coordinate values of the probe 24*a* at the replacement position EP from the drive controller 28 or the like as shown in FIG. 14 and so on, and sets the replacement position EP as the fourth intermediate point C4 based on the coordinate values (step S15). Note that step S15 corresponds to the fourth intermediate point setting step of the present disclosure. Then, the process from steps S2 to S8 described above is repeatedly executed.

In a case where the teaching operation (the measurement element specifying operation M1 and the termination operation M2) for all the measurement elements of the workpiece W is completed (NO in step S9), the user executes the end operation of the teaching operation by operating the probe operating unit 28*a* (step S16).

In a case where the end operation of the teaching operation is executed, the measurement program generation unit 56 generates the measurement program 37 as described in FIG. 15, based on the coordinate values of each measuring point P of each measurement element acquired by the coordinate value acquisition unit 44 and the coordinate values of the intermediate points C1 to C4 set by the intermediate point setting units 48, 50, 52, and 54, respectively. Note that step S17 corresponds to the measurement program generation step of the present disclosure.

The measurement program generation unit 56 then stores the generated measurement program 37 in the storage unit 41. Consequently, in a case where the three-dimensional coordinate measuring machine 10 repeatedly executes measurement of each measurement element of two or more workpieces W with the same shape, the drive control unit 42 can bring the probe 24*a* into contact with all the measuring points P for each measurement element of the workpieces W by driving the drive controller 28 (the probe drive unit 35 and the XYZ drive unit 36) according to the measurement program 37. As a result, the reproducibility of the measurement results for the measurement elements is secured and labor saving is further promoted in the quality control process.

As described above, in the present embodiment, the intermediate points C1 to C4 can be automatically set while the user is executing the teaching operation, so that the measurement program 37 can be automatically generated. Thus, because it is unnecessary for the user to manually set moving route points or the like on the measuring route, occurrence of malfunctions due to human error is prevented. Moreover, it is not necessary to generate the measurement program 37 based on a CAD data on the workpiece as in conventional art, and even the users who have little insight into the three-dimensional coordinate measuring machine 10 can easily generate the measurement program 37. As a result, anyone can easily and automatically generate the measurement program 37 which is free from malfunction.

Others

The embodiment has been described by taking the gantry-style three-dimensional coordinate measuring machine 10 as an example. However, the present disclosure is applicable to the three-dimensional coordinate measuring machine 10 of various types, and the types of the probe 24*a* used in the three-dimensional coordinate measuring machine 10 are also not particularly limited. In the above embodiment, the three-dimensional coordinate measuring machine 10, the drive controller 28, and the computer 32 are separated from each other. However, the three-dimensional coordinate measuring machine 10 may be integrated with at least one of the drive controller 28 and the computer 32.

The software program 32*a* that implements the functions of the computer 32 described in the above embodiment may be stored in computer-readable media (non-transitory, tangible information storage media) such as optical disks, magnetic disks, and so on, and the software program 32*a* may be supplied through the media. Instead of the aspect of storing and supplying the software program 32*a* with such information storage media, signals of the measurement program may be supplied as download service using communication networks such as the Internet.

REFERENCE SIGNS LIST

10 . . . three-dimensional coordinate measuring machine, 12 . . . frame, 14 . . . table,
16L . . . left Y-carriage, 16R . . . right Y-carriage, 18 . . . X-Guide, 20 . . . X-Carriage,
22 . . . Z-Carriage, 24 . . . probe head, 24*a* . . . probe, 26 . . . gantry-style frame, 28 . . . drive controller
28*a* . . . probe controlling unit, 30 . . . communication interface, 32 . . . computer,
32*a* . . . software program, 35 . . . probe drive unit, 36 . . . XYZ drive unit,
37 . . . measurement program, 38 . . . display unit, 39 . . . generation start screen, 40 . . . control unit,
41 . . . storage unit, 42 . . . drive control unit, 44 . . . coordinate value acquisition unit,
46 . . . shape calculation unit, 48 . . . first intermediate point setting unit,
50 . . . second intermediate point setting unit, 52 . . . third intermediate point setting unit,
54 . . . fourth intermediate point setting unit, 56 . . . measurement program generation unit,
58 . . . change screen, A . . . rotation axis, B . . . rotation axis, C1 . . . first intermediate point,
C2 . . . second intermediate point, C3 . . . third intermediate point,
C4 . . . fourth intermediate point, EP . . . replacement position, K . . . intersection point,
M1 . . . measurement element specifying operation, M2 . . . termination operation,
M3 . . . retreating operation, P . . . measuring point, RP . . . reference point,
SL . . . fitting straight line, SP . . . initial position, W . . . workpiece

What is claimed is:

1. A measurement program generation method of generating a measurement program representing a measuring route of a probe of a three-dimensional coordinate measuring machine that measures one or more measurement elements of an object to be measured using the probe, the measurement program generation method comprising:

a manual operation step of manually executing a measurement element specifying operation to bring the probe into contact with measuring points on a measurement element, and a measurement element confirming operation to indicate an end of the measurement element specifying operation, for each of the one or more measurement elements;

a coordinate value acquisition step of acquiring coordinate values of the measuring points with which the probe is brought into contact;

a first intermediate point setting step of setting, each time when the coordinate values of one measuring point of the measuring points are acquired in the coordinate value acquisition step, a first intermediate point at a position that is offset from the one measuring point in a direction opposite a contact direction of the probe with the one measuring point, based on the coordinate values of the one measuring point and on the contact direction;

a second intermediate point setting step of setting as a second intermediate point, a position of the probe when the measurement element confirming operation is executed;

a third intermediate point setting step of acquiring a moving locus of the probe during movement of the probe in the manual operation step, approximating the moving locus by a plurality of straight lines, and setting a third intermediate point at an intersection point between the straight lines that are different from each other; and a program generation step of generating the measurement program, based on the coordinate values of the measuring points acquired in the coordinate value acquisition step, coordinate values of the second intermediate point set in the second intermediate point setting step, and coordinate values of the third intermediate point set in the third intermediate point setting step.

2. The measurement program generation method according to claim 1, wherein the manual operation step includes a retreating operation to manually retreat the probe from the object to be measured, to a replacement position where the probe is replaceable, the measurement program generation method further comprises a fourth intermediate point setting step of setting as a fourth intermediate point, the replacement position when the retreating operation is executed, and in a case where the retreating operation is executed, in the program generation step, the measurement program is generated based on the coordinate values of the measuring points, the coordinate values of the second intermediate point, the coordinate values of the third intermediate point, and coordinate values of the fourth intermediate point set in the fourth intermediate point setting step.

3. The measurement program generation method according to claim 1, wherein in the third intermediate point setting step, the moving locus is approximated by the plurality of straight lines by performing linear fitting on the moving locus.

4. The measurement program generation method according to claim 3, wherein the third intermediate point setting step includes:

a repeat calculation step of repeatedly executing calculation of a fitting straight line that is fit to the moving locus from an initial position of the probe to a current position of the probe and calculation of a fitting error that is an error between the fitting straight line and the moving locus, during the movement of the probe until the probe reaches a first intersection point; and a determination step of determining whether or not the probe has passed a new intersection point each time when the fitting error is calculated in the repeat calculation step, based on whether or not the fitting error is larger than a predetermined threshold, and the threshold is variable.

5. The measurement program generation method according to claim 3, wherein the third intermediate point setting step includes:

a repeat calculation step of repeatedly executing calculation of a fitting straight line that is fit to the moving locus from a previous intersection point to a current position of the probe and calculation of a fitting error that is an error between the fitting straight line and the moving locus, during the movement of the probe; and a determination step of determining whether or not the probe has passed a new intersection point each time when the fitting error is calculated in the repeat calculation step, based on whether or not the fitting error is larger than a predetermined threshold, and the threshold is variable.

6. A three-dimensional coordinate measuring machine which measures one or more measurement elements of an object to be measured using a probe, the three-dimensional coordinate measuring machine comprising:

a manual operation unit configured to be capable of executing a measurement element specifying operation to bring the probe into contact with measuring points on a measurement element, and a measurement element confirming operation to indicate an end of the measurement element specifying operation, for each of the one or more measurement elements, by manual operation;

a coordinate value acquisition unit configured to acquire coordinate values of the measuring points with which the probe is brought into contact;

a first intermediate point setting unit configured to set, each time when the coordinate value acquisition unit acquires the coordinate values of one measuring point of the measuring points, a first intermediate point at a position that is offset from the one measuring point in a direction opposite a contact direction of the probe with the one measuring point, based on the coordinate values of the one measuring point and on the contact direction;

a second intermediate point setting unit configured to set as a second intermediate point, a position of the probe when the measurement element confirming operation is executed;

a third intermediate point setting unit configured to acquire a moving locus of the probe during movement of the probe according to the manual operation, approximate the moving locus by a plurality of straight lines, and set a third intermediate point at an intersection point between the straight lines that are different from each other; and a program generation unit configured to generate a measurement program representing a measuring route of the probe based on the coordinate values of the measuring points acquired by the coordinate value acquisition unit, coordinate values of the second intermediate point set by the second intermediate point setting unit, and coordinate values of the third intermediate point set by the third intermediate point setting unit.

7. The three-dimensional coordinate measuring machine according to claim 6, wherein the manual operation unit is capable of executing a retreating operation to retreat the probe by manual operation from the object to be measured to a replacement position where the probe is replaceable, the three-dimensional coordinate measuring machine further comprises a fourth intermediate point setting unit configured to set as a fourth intermediate point, the replacement position when the manual operation unit executes the retreating operation, and in a case where the manual operation unit executes the retreating operation, the program generation unit generates the measurement program based on the coordinate values of the measuring points, the coordinate values of the second intermediate point, the coordinate values of the third intermediate point, and coordinate values of the fourth intermediate point set by the fourth intermediate point setting unit.

* * * * *